United States Patent [19]
Zinn, Jr.

[11] 4,218,615
[45] Aug. 19, 1980

[54] INCREMENTAL DIGITAL SHAFT ENCODER

[75] Inventor: Werner G. Zinn, Jr., Orlando, Fla.

[73] Assignee: Martin Marietta Corporation, Orlando, Fla.

[21] Appl. No.: 953,730

[22] Filed: Oct. 23, 1978

[51] Int. Cl.² .............................................. G01D 5/34
[52] U.S. Cl. ........................ 250/231 SE; 250/237 G; 356/373; 356/375; 356/395
[58] Field of Search ......... 250/231 R, 231 SE, 237 R, 250/237 G; 356/395

[56] References Cited
U.S. PATENT DOCUMENTS

| 3,812,352 | 5/1974 | MacGovern | 250/237 G |
| 4,051,367 | 9/1977 | Sayce et al. | 356/395 |

Primary Examiner—David C. Nelms
Attorney, Agent, or Firm—Julian C. Renfro; Gay Chin

[57] ABSTRACT

An optical incremental shaft encoder in accordance with this invention involves an illumination source arranged to direct light through an optical slit, with the light then falling upon a series of very closely spaced lines forming a first grating. I have discovered that close by this grating a series of image planes are formed, with each plane containing multiple images of the slit. Generally, these images are distinct for distances of only 1/10th of an inch or less with respect to the grating or mask, and for the purpose of this invention, I do not use image planes further away from the mask or grating than this distance. I have found a way to utilize this diffraction phenomenon to great advantage by providing another grating-like member, placed at a selected one of the image planes, whose line spacing is identical to the image line spacing. This second grating-like member may be linear, or curved in an arcuate-like manner, but in any event, it is arranged to move to reflect the motion of a device whose velocity or position is desired to be sensed accurately. In a first embodiment of my invention, a rotor containing this second grating member is arcuately shaped and is arranged to sense the rotary velocity of a shaft. Whereas a single light source and a single detector are utilized in that embodiment, if a pair of closely spaced light sources and a pair of detectors aligned therewith are utilized, the invention can be used for measuring displacement, such as of a gimbal or the like. As the rotor of my invention is moved by the device, its lines ordinarily mask and unmask the image lines of the selected plane, thus causing a modulation of the transmitted light. This light intensity variation is sensed by a photo detector placed next to the rotor, and by means of well-known processing methods, I interpret the electrical signals from the sensors in order to determine the velocity or displacement of the device.

6 Claims, 7 Drawing Figures

INCREMENTAL DIGITAL SHAFT ENCODER

BACKGROUND OF THE INVENTION

In the past, a number of incremental shaft encoders have been proposed, and one example of these has been a simple illuminated slit and moving grid arrangement. As the grid moves, its lines alternately cover and uncover the slit, modulating the light from the illumination means falling on the photodetector. This system is applicable for only relatively crude measurements, and the fact that the light diverges after leaving the slit makes it necessary that the moving grid be close to the slit. The slit can be made narrower to help this, but this reduces the amount of light available and lowers signal level. As the resolution requirements increase and/or the size decreases, spacings become impractical and diffraction effects begin to appear which give spurious results.

A refinement of the foregoing type of arrangement involves the incorporation of a collimating lens. The lens serves to lessen the spread of the beam after it passes through the slit and allows smaller line spacing, and consequently enables small size and/or better resolution of the moving part. As size is reduced and/or better resolution required, the collimating requirements become more severe so that the collimator becomes more expensive and larger in size. Ultimately, diffraction effects prevent further improvements.

Perhaps the most common embodiment of a shaft encoder is similar in principle to the slit/rotating grip type, but has modifications which improve its performance. This type consists of a mask of alternate opaque and transparent lines illuminated with collimated light. Next to this is a moving part containing alternate dark and transparent lines. As this latter part moves, its lines alternately block and unblock the light passing through the transparent portions of the fixed mask. Once more, collimation requirements become more severe as size is reduced or resolution increased and ultimately diffraction effects prevent any further improvement.

It was to overcome the disadvantages of these prior art arrangements that the present invention was evolved.

SUMMARY OF THE INVENTION

An optical incremental shaft encoder in accordance with this invention utilizes a monochromatic light source, and a slit through which such light is directed. Spaced relatively closely to the slit is a fixed mask made up of closely spaced alternate transparent and opaque lines, with the diverging light rays from the slit falling on the lines of the fixed mask and thereby forming a diffraction optical system. A plurality of images of the slit are generated, which appear at discrete planes spaced from the fixed mask.

A movable mask having closely spaced alternating transparent and opaque lines is used at a preascertained spacing from the fixed mask, with the spacing of this second mask being such as to closely match the spacing of the image lines of a selected image plane. The movable mask is connected in accordance with this invention to a device whose motion is to be measured, with this mask being movable while at the same time maintaining its precise relationship to the plane containing the selected image. Photo detector means are utilized for sensing the alternate light and dark resulting from movement of the movable mask in the plane containing the images.

The optical incremental shaft encoder in accordance with this invention utilizes processing means operatively associated with the photo detector means such that the number of times that the lines of the movable mask intercept the image lines can be accurately counted, such processing means thus providing an output as to the motion of the moving device. My invention is broad enough to include the second mask being connected to move with either a rotationally movable or a linearly movable member.

One embodiment of my invention can involve the use of a single light source and detector combination, with this type of arrangement typically being utilized for measuring velocity. On the other hand, by utilizing two light source-detector pairs, position information can be derived, with the lines of the fixed mask associated with a first light source-detector pair typically being offset from the lines of the fixed mask associated with the second light source-detector pair. The resulting device not only can measure displacement, but also it can identify the specific direction in which the linear or rotary motion commenced in a given instance.

In an embodiment of my device concerned with rotary displacement, it is to be noted that the closely spaced radial lines of the rotating member diverge in much the manner that the spokes of a wheel diverge in the outward direction. It is a fact that the relationship between the slit, the fixed mask and the line density of the fixed mask determines the location of the image planes, including the image plane selected to interact with the movable grating. Inasmuch as my device can be greatly simplified by having the image planes associated with the pair of light sources occurring at the same distance from the slit, I slope the radial lines of the first grating downwardly in the direction toward the slit, which has the result of keeping the image planes associated with the two light sources in the same plane.

Initialization of either a linear or a rotary device can be achieved by placing ancillary light sources at opposite ends of the movable grid, with respective detectors being utilized with these ancillary light sources. Upon the commencement of motion of the movable grid, one of the ancillary light sources will remain unaffected or perhaps becomes brighter, whereas the other will become occluded, as the result of the motion of an opaque portion of the movable grid between the light source and its respective detector. The outputs of the ancillary detectors can be sensed by a differential amplifier, and this information employed in the processing circuit in such a way as to indicate movement of the movable grid away from its neutral or reference position.

It is a primary object of my invention to provide a shaft encoder of high accuracy and high resolution, yet of quite small size and low moment of inertia.

It is another object of my invention to provide a pickoff device of very small size, yet having an accuracy consistent with devices that are considerably larger and bulkier.

It is yet another object of my invention to provide a highly accurate yet low cost optical pickoff that is advantageously of small size, and which does not require the use of collimated light.

These and other objects, features and advantages will be more apparent as the description proceeds.

DETAILED DESCRIPTION

Figure 1:
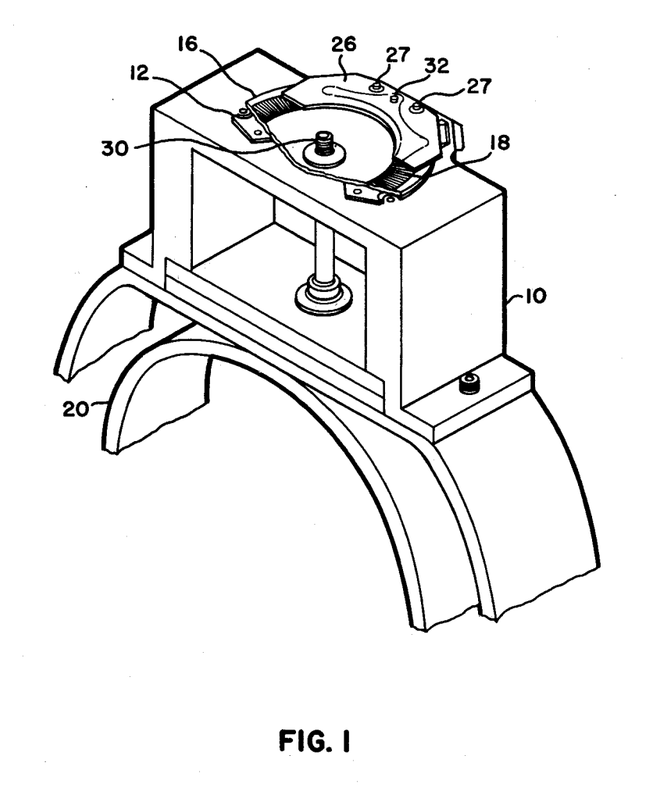
FIG. 1 is a perspective view of an operative pickoff device in accordance with this invention, in which a single light source and a single detector are utilized, with this device being adapted for measuring rotational velocity.

Turning to FIG. 1, I have there shown an exemplary rotary embodiment of my invention, including a housing 10 which forms a support for certain related optical components associated with this invention, including a fixed plate 12 forming a support for a slit and first optical grating, and a movable plate 16 serving as a support for a second optical grating. Supported in the housing 10 at an appropriate location is an illuminating means of small size, which, for example, can be a light emitting diode (LED). It is to be noted that neither the light source, nor the slit and gratings through which the light is directed, are illustrated in this figure, and these, as well as their relationships, will be discussed at greater length hereinafter. A linear version of my invention will also be later discussed.

Extending through the housing 10 is a rotatable shaft 30, with the upper end thereof forming the support for a movable plate 16. The shaft 30 is typically connected at its other end to a machine tool, gyroscope gimbal 20 or the like, depending on the particular application. Located above the movable plate 16 in a position spaced so as not to interfere with its motion, is a detector support plate 26, held in place by a pair of screws 27. This latter plate contains a detector means 32 which is connected into circuitry designed to detect and amplify the optical information obtained with respect to the movements of the gyro gimbal, with the detection of signals being accomplished as a result of the cooperation of the optical components mentioned above.

Figure 2:
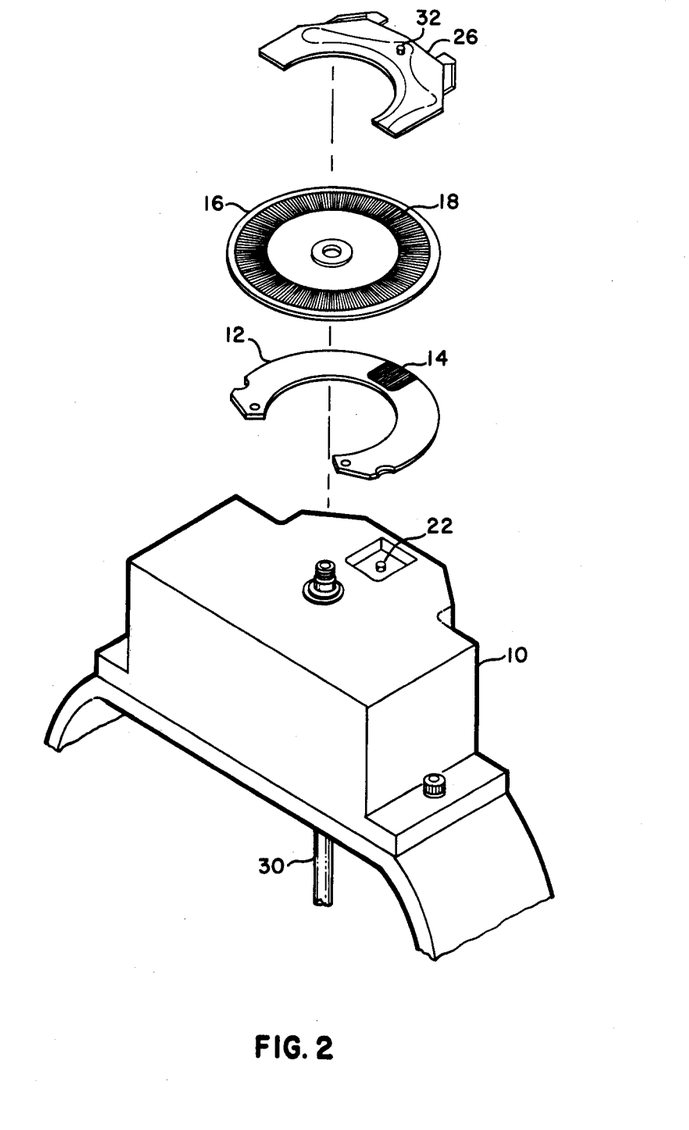
FIG. 2 is an exploded view of the device of FIG. 1, revealing the light source, first and second gratings, and certain other components of this invention, with the second grating being revealed to extend arcuately for a full circle.

Turning to FIG. 2, it will there be seen that I have shown several components in exploded relation, with the upward displacement of plate 12 (and other components) for clarity reasons enabling the recessed light source 22 disposed in the housing 10, as well as the first and second optical gratings 14 and 18, to become visible. Although not shown in either FIG. 1 or FIG. 2, it nevertheless is to be understood that disposed below the first optical grating 14 of the fixed plate 12 is a slit through which light from the light source 22 is directed.

This particular embodiment of my invention is designed to measure velocity, and is, therefore, ideal for tachometer applications, such as in machine tools or the like. Since the embodiment of FIG. 2 is less complex than the version of my invention concerned with measuring displacement, I have chosen to explain its construction and operation before introducing the version using a pair of light sources and a pair of detectors. It should be noted in passing that the movable plate 16 forms a full circle in the embodiment illustrated in FIG. 2, with the second optical grating 18 extending for 360°. Also, the shaft 30 typically extends in this instance to a machine tool or other device requiring velocity information.

Figure 3:
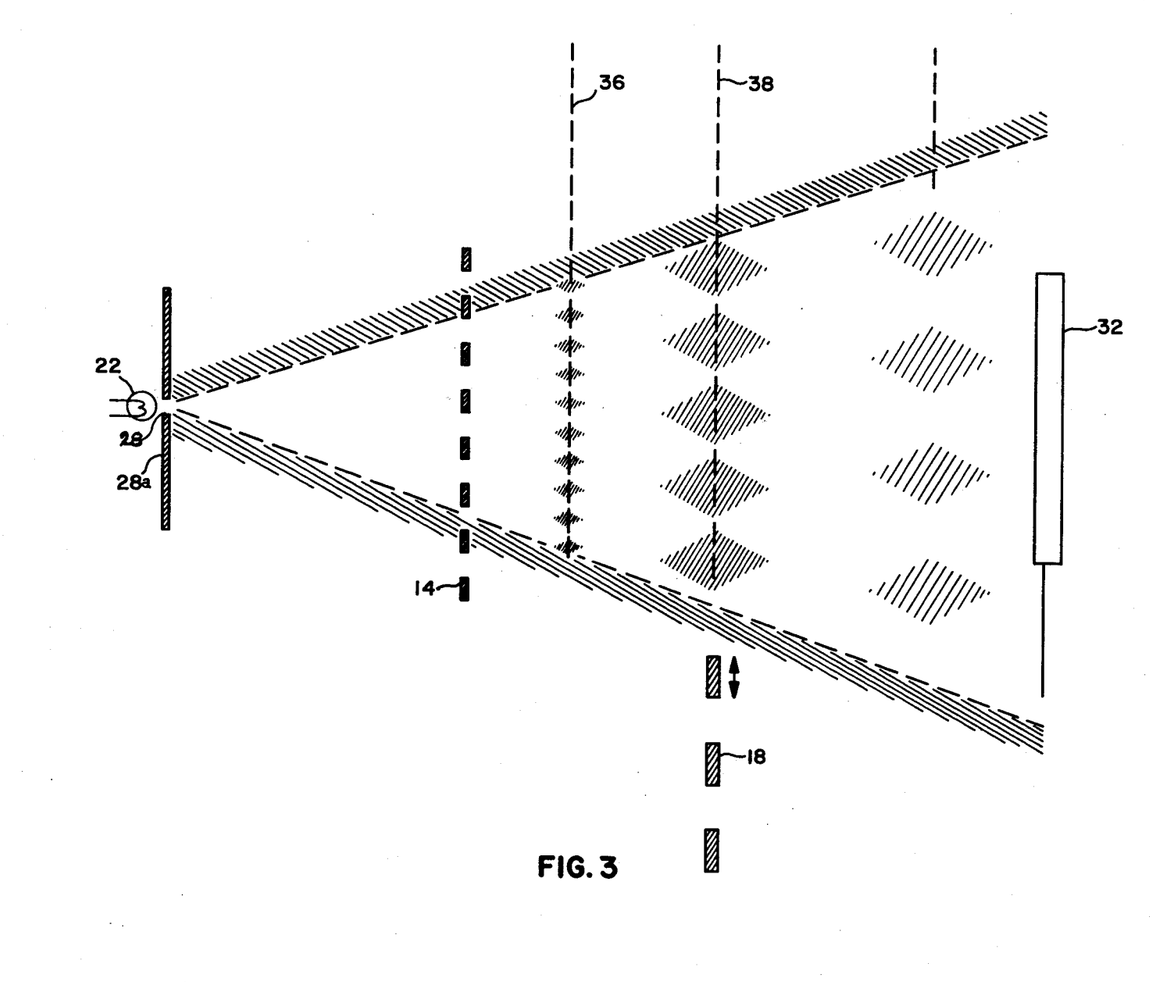
FIG. 3 is a greatly magnified view, revealing a cone of light created by a light source direction light through a slit and first grating, with the result being a plurality of image planes established at spaced locations.

Turning to FIG. 3, it is to be seen that the relationship of the light, the slit and the first grating results in the forming of a number of image planes, in which a number of bright images of the slit are created. Of these image planes, I am principally concerned herein with the first single image plane 38.

As will be noted in this Figure, monochromatic light source 22 illuminates slit 28. The spectrum of this light source is several hundred Angstroms wide and, as previously indicated, the light source may be an LED. The diverging rays of light emanating from the slit 28 fall on a fixed mask of alternate transparent and opaque lines, which was previously described as first grating 14. This combination, when appropriate dimensions are chosen, forms a diffraction optical system which generates images of the slit at discrete planes spaced from the mask. In the cone of light depicted in FIG. 3, the distance between the slit 28 and mask 14 is shown to be roughly equal to the mask to image 38 distance, whereas in an actual system, the slit-mask distance is much greater. For instance, a practical system would have a slit-mask spacing of 0.125 inches and a mask-first image distance of 0.015 inches.

In actuality, there are a series of image planes extending out from the mask 14. The first of these is image plane 36, which is called the double image plane since it contains roughly twice as many lines as the mask. Next, is the first single image plane 38, which has the same number of image lines as the mask 14. Beyond this are other image planes, of which only the second single image plane is shown. Also, not shown in the drawing are additional double-image planes spaced between the single image planes. The first image planes are the sharpest, whereas the images spaced further from the first grating are broader and more widely spaced. Although other image planes, such as the first double image plane 36 may be utilized, I prefer, as earlier mentioned, to use the first single image plane 38 in connection with this invention.

The second optical grating 18 mentioned in connection with FIG. 2 is depicted in FIG. 3 as being disposed at the location of image plane 38. The spacing of the lines of the second mask 18 are carefully chosen so as to exactly match the image line spacing in plane 38. If now the movable mask 18 is moved in a precise manner across this image plane, it will alternately block and unblock the light as the mask lines cross the image lines. This is sensed by photodetector means, such as photodetector 32, and thereinafter processed by the circuitry of this invention in order to ascertain velocity in an embodiment concerned with the measurement of same.

The detector 32 sees a variation in light level caused by the motion of the movable mask, and provides a varying D.C. output. For continuous motion of the movable mask, the envelope of this varying D.C. signal is approximately sinusoidal. The detector may be a solar cell, a silicon phototransistor, a silicon photodiode, or another suitable photosensitive device. The detector may for example be 0.040 inches in diameter, and because of the small distances involved, the detector will work equally well with whatever image plane is being intercepted by the grating lines of the movable mask.

The images of the slit are most intense at the centerline defined by the LED and slit, and become less intense as one moves away from this line. The spacing of the images is given by:

Image period = grating period times (a+b)/a where the image period is defined as the distance between centers of two image lines, and the grating period is defined as the distance between centers of two adjacent transparent portions, or centers of two adjacent opaque portions, and where a is defined as the slit to first grating distance, and b is defined as the first grating to image plane distance.

Typical values for a system using an LED with a radiation wave length of $0.93\mu$ are:
1st grating period: $19.30\mu$
2nd grating period: $22.06\mu$
Image distance from 1st grating: $406\mu$
Slit to 1st grating distance: $3,175\mu$ Turning now to FIG. 4, I there illustrate in exploded relation, an embodiment concerned with the measurement of displacement, which device is ideal for use in position indicators. Although a device of this particular type could obviously be used in conjunction with machine tools, here I employ it in connection with a gyro gimbal, a fragmentary portion of which is shown at 50 in FIG. 4.

Figures 4, 4A:
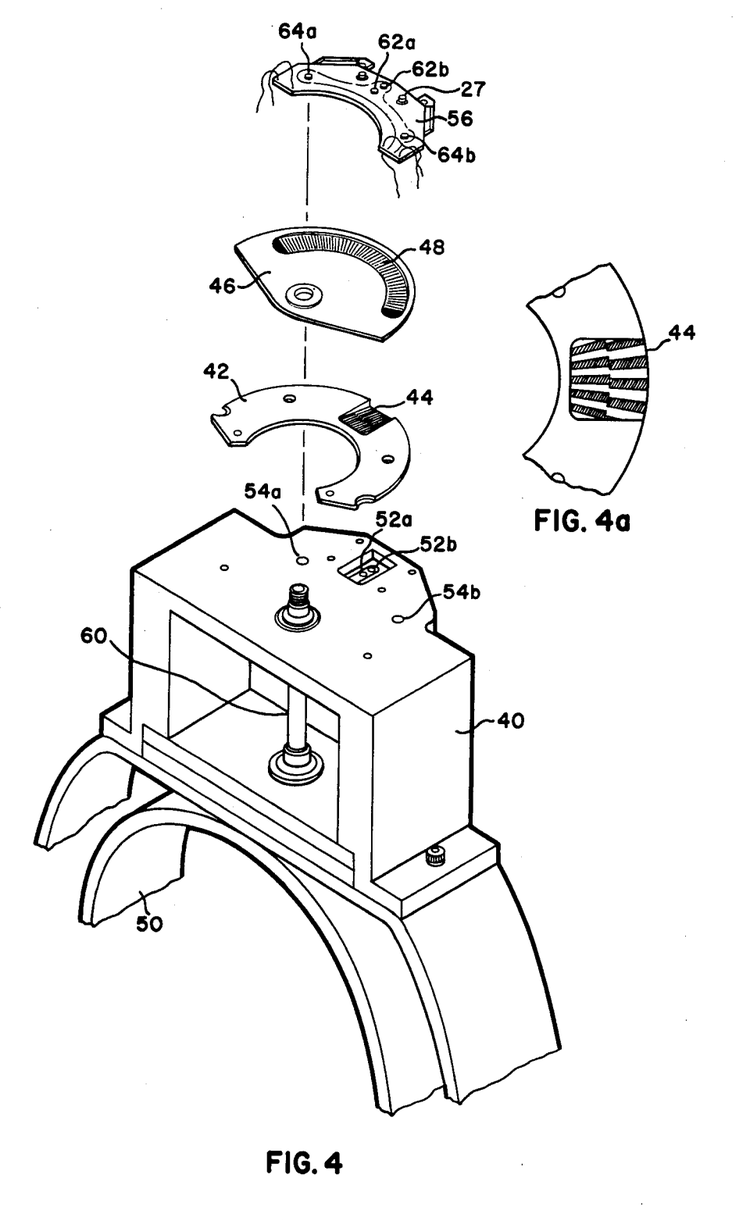
FIG. 4 is an exploded view of a version of my invention adapted for measuring rotary displacement, with this embodiment utilizing a pair of primary light sources and a pair of primary detectors, as well as ancillary light sources and detectors.
FIG. 4a is a fragmentary view to a considerably larger scale of the fixed mask, showing the displacement of the lines for the two channels.

In accordance with this embodiment, I utilize a pair of recessed light sources 52a and 52b disposed on what may be regarded as a common radius out from shaft 60, with these light sources being at different distances from the shaft. A corresponding pair of detectors 62a and 62b are used on detector support plate 56, with the arrangement and placement being such that light from sources 52a and 52b passes through respective slits (not shown), fixed gratings 44, movable grating 48 and then falls upon respective detectors 62a and 62b. As will be made clear as the description proceeds, the use of the pair of light sources, along with respective slits, properly configured gratings, and respective detectors makes it possible, with the use of circuitry described hereinafter, to detect the amount and direction of motion of the plate 46 resulting from rotation of shaft 60, upon the upper end of which shaft the plate is mounted.

As a consequence of the use of a pair of light sources and detectors in this embodiment is the use of a grid 44 of radially extending lines, wherein the line portions associated with one light source and detector are offset with respect to the line portions associated with the other light source and detector. In other words, there is a juncture at a midpoint of the lines of the grid 44, at which the radially inward line portions are moved slightly out of alignment with the radially outward line portions, while at the same time, the two parts of each line remain in a parallel relationship. In FIG. 4a, all of the radial lines appear parallel to each other, but this is due to their downward slope, described hereinafter.

Because of the offset depicted in FIG. 4a, signals indicative of the direction of rotation of the plate 46 can be derived, in that there is a phase shift of 90° leading for rotation of plate 46 in one direction, and a phase shift of 90° lagging for rotation in the other direction. Desired polarity can be achieved by creating the offset in a particular direction.

An alternative to the use of a pair of light sources and a pair of detectors at different radial distances from the axis of rotation of the plate 46 is the use of a first light source-detector combination disposed in an arcuately offset relation to the second light source-detector combination, but with each of these combinations at the same radial distance from the shaft 60. In such instance, the desired 90° phase shift is established by adjusting very precisely, the distance between the fixed gratings used with each of these combinations. Although this arrangement has certain advantages, it suffers the disadvantage that if such a device is subjected to a pronounced temperature change, this well may result in an unwanted phase shift brought about by the distance between the two fixed grids changing.

Returning to the rotary embodiment illustrated in FIG. 4, it is to be realized that for a given wavelength, the image distance is determined by the line spacing of the fixed grid. It will therefore be understood that when the fixed grid is made up of one section disposed at a greater radius than the other section, the spacing would normally be greater for the lines disposed at a greater radius, and this would have the unfortunate consequence of causing the image plane it creates to be at a different position than the plane created by the radially inward grid portion. Since this would make exceedingly complicated the proper location of the second or movable grid such that these image planes coincide therewith, I compensate for the increase of line spacing with increase of radius by sloping the radial lines of grid 44 downwardly, as indicated in FIG. 4, which is generally in the direction of the slit. The slope needed in one embodiment of my invention turned out to be 30°. By controlling the slope of the fixed grid lines to an amount appropriate under a given circumstance, I am able to assure the placement of both images planes precisely in the plane of the rotating grid. Appropriate initial alignment of the grids is achieved by small rotative adjustments of the legs of plate 42 about the sources 52a and 52b.

Because this embodiment is concerned with displacement rather than velocity, there is no need for the second grid 48 to extend 360°, and for example, in this embodiment, the closely spaced grating lines 48 may have an arcuate extent of say 135°.

It is desirable to be able to detect the initial movement of the movable plate 46 away from a centered or reference position, and to that end I dispose an additional pair of light sources in the housing 40, with these ancillary light sources 54a and 54b being located approximately equal distances from the pair of light sources 52a and 52b. The light means 54a and 54b are located at each end of the transparent portion of the second grating 48, with the alignment being such that equal amounts of light pass through the aperture portion of the movable plate 46 and fall upon additional detectors 64a and 64b located on plate 56 when the movable plate 46 is in its centered position. These latter detectors are utilized in a circuit concerned with establishing whether equal amounts of light are falling upon these detectors.

As is obvious, upon the plate 46 rotating as a result of angular shaft motion away from the centered position, one ancillary light source 54a or 54b will be uncovered to a greater extent, whereas the light permitted to pass from the other light source will be diminished by the opaque portion of plate 46. In this way, one of the detectors 64a or 64b will receive more light, and this unbalance results in a signal which is utilized in the initial phase of operation of my device, in a manner described more fully hereinafter.

Figure 5:
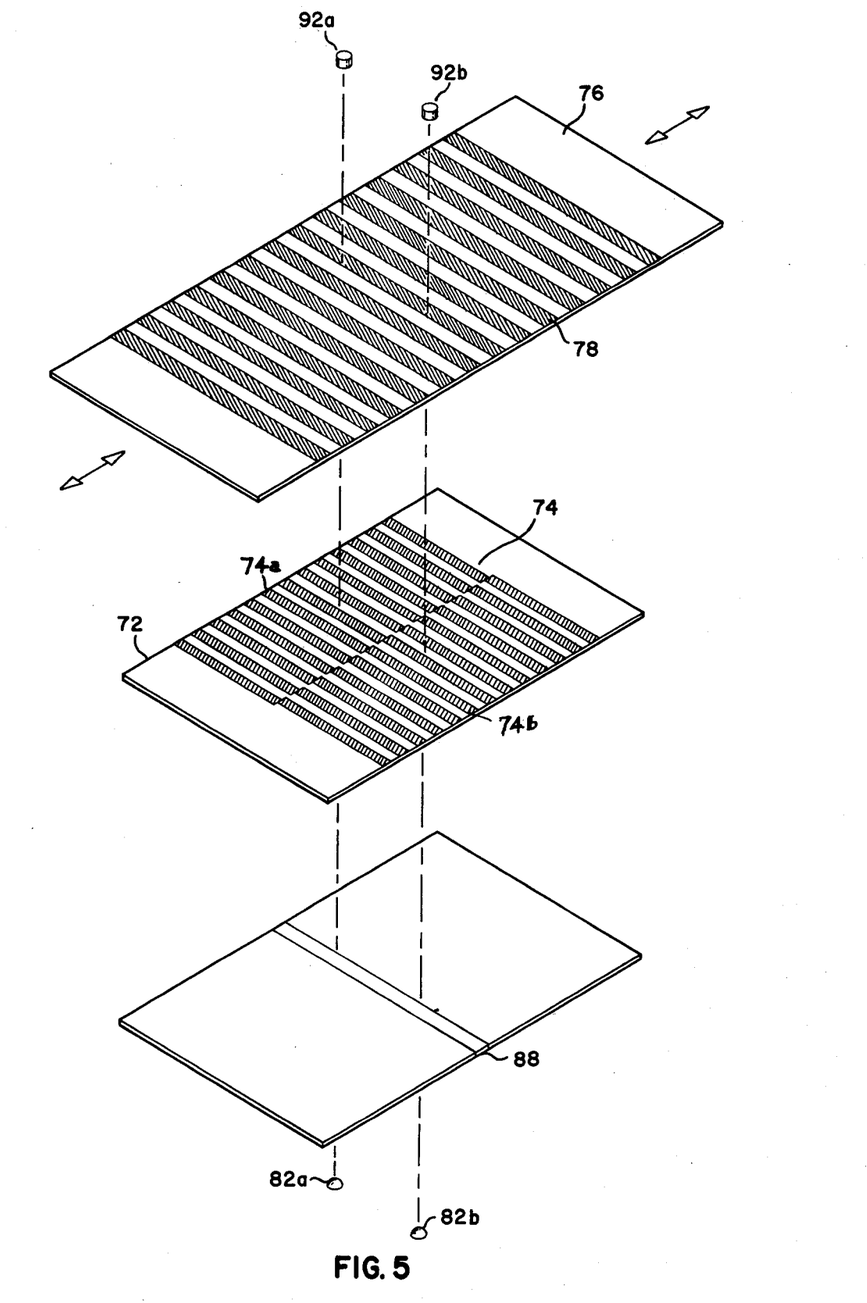
FIG. 5 is another embodiment of my invention, this being a linear device particularly adapted for use with machinery in which rotation is not involved.

Turning to FIG. 5, it will there be seen that in this linear embodiment of my invention, I use light sources 82a and 82b directing light through a slit 88, with this light then falling upon grating 74 contained on fixed plate 72. For reasons previously explained, it is desired that one signal output be displaced phasewise with respect to the other, so it will be noted that grating lines 74a are displaced an appropriate amount from the grating lines 74b, while remaining parallel thereto.

The light leaving the first grating 74 then travels to the second grating plate 76, which is movable longitudinally, such as by being connected to a non-rotary component of a machine. The grating lines 78 of this device are spaced to the same width as the image lines created by the offset lines of grids 74a and 74b, and detectors 92a and 92b are able to detect the dark and light which results from movement of the member 76. Appropriate processing circuitry enables direction of motion and the extent of displacement to be easily ascertained.

Although the light from sources 82a and 82b is shown as single beams, it is to be realized that non-collimated light is used in accordance with this invention, and the beams from these sources will spread and actually intercept a number of grating lines.

An initialization circuit may obviously be used to indicate motion of plate 76 away from a reference position, and to this end, a set of ancillary source-detector combinations generally along the lines of those used in connection with the embodiment of FIG. 4 may be employed in the arrangement depicted in FIG. 5. Usually, however, the machine to which plate 76 is connected will have its own reference position arrangement, and additional devices for this purpose are generally not necessary.

Figure 6:
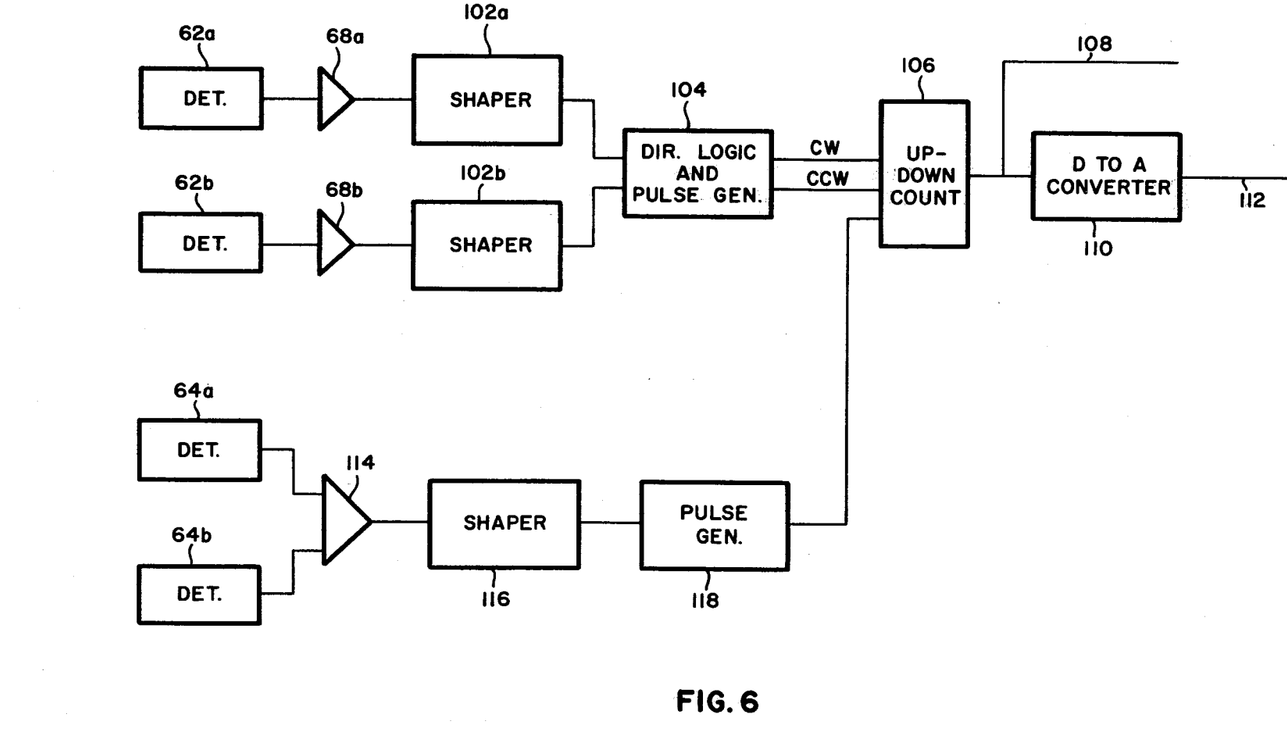
FIG. 6 is a block diagram of an exemplary electronic circuit utilized in order to convert detector outputs into useful information.

A typical signal processing means appropriate for use with the embodiment of FIG. 4 is shown in FIG. 6, wherein photodetectors 62a and 62b are provided in order to sense the light variations caused by the second grating or rotor 46 moving in the image plane. This brings about the creation of electrical signals which vary approximately sinusoidally with motion of the rotating mask 46 and these are amplified by the amplifiers 68a and 68b respectively. The sinusoidal signals are then fed into shapers 102a and 102b, which convert the sine waves into square waves. The square waves are then fed into the direction logic and pulse generator 104. This senses the direction of rotation by comparing the phases of the two signals, generates pulses from the transitions of the signals, and then applies them to a clockwise or counter-clockwise line, depending on the direction of rotation of the rotating member. These two signal lines then drive an UP/DOWN counter 106, and the particular output obtained is a function of the counter selected. If a digital representation of the shaft angle is required, then the output 108 of counter 106 may be directly used. If an analogue representation of the shaft position is desired, then the counter output is fed into a digital to analogue converter 110, which has an output 112. In one exemplary system with which my device was used, the calibration was one volt per 3 degrees of rotation.

The detectors 64a and 64b are positioned to sense the ends of the second grating 48, and are placed so that when the rotor containing the second grating is at its null or reference position, the electrical signals from 64a and 64b are equal. The signals from these two detectors are then fed into a differential amplifier 114. As the rotor rotates past the null position, the output of differential amplifier 114 will vary smoothly from one polarity to the other, producing a transitional signal. The output of amplifier 114 is positive or negative, depending on which side of the null position the rotor resides. The amplified signal is fed into a shaper 116, which produces an abrupt transition at its output at the instant the amplified signal passes through zero. The shaper output is then fed to a pulse generator 118 which generates a pulse for each transition of the shaper output. This pulse is then fed to the UP-DOWN counter 106, setting its output to that value corresponding to the null position of the rotor and hence initializing the system.

Whereas prior art sensors required collimated light in order to obtain high resolution, my invention advantageously makes unnecessary the use of collimated light and the lens arrangements normally attendant to the use of collimated light, while at the same time attaining in a device of very small size, a resolution unquestionably better than that attained by the use of prior art devices.

I claim:

1. An optical incremental shaft encoder comprising a monochromatic light source, an adjacent slit through which light from said source is directed, and an adjacent fixed mask of closely spaced alternate transparent and opaque lines, the diverging light rays from said slit falling on the lines of said fixed mask and thereby forming a diffraction optical system which generates images of said slit at discrete planes spaced from said fixed mask, a movable mask having closely spaced alternate transparent and opaque lines, with the spacing of such lines being such as to match the spacing of the lines of a selected image plane, said movable mask being connected to a device whose motion is to be measured, and being movable in a plane essentially parallel to the selected image plane, and photodetector means placed to sense alternating light and dark resulting from movement of said movable mask.

2. The optical incremental shaft encoder, as defined in claim 1, in which processing means operatively associated with said photodetector means are utilized for counting the number of times that the lines of said movable mask intercept the image lines, and for providing therefrom a readout as to the motion of the device whose movement is being measured.

3. The optical incremental shaft encoder as defined in claim 2 wherein said device is a rotary device.

4. The optical incremental shaft encoder as defined in claim 2 wherein said device moves linearly.

5. The optical incremental shaft encoder as defined in claim 2 in which a pair of light sources, slits and respective detectors are utilized, thus enabling position information, as well as the direction of movement of said movable mask, to be established.

6. The optical incremental shaft encoder as defined in claim 2 in which an additional light source is utilized near each end of said movable mask, and a respective detector is used with each of said additional light sources said processing means providing an indication as to movement of said movable mask away from an initial position.

* * * * *